United States Patent [19]

Edmonds

[11] Patent Number: 4,473,746

[45] Date of Patent: Sep. 25, 1984

[54] MULTIPLE HEAD OPTICAL SCANNER

[75] Inventor: Paul E. Edmonds, Lenexa, Kans.

[73] Assignee: Bell & Howell Company, Chicago, Ill.

[21] Appl. No.: 288,564

[22] Filed: Jul. 30, 1981

[51] Int. Cl.³ .............................................. H01J 5/16
[52] U.S. Cl. ................................. 250/216; 250/578; 235/462; 235/470
[58] Field of Search ...................... 358/212, 213, 285; 356/446, 448; 250/216, 566, 567, 568, 569, 578; 235/462, 470, 461, 454

[56] References Cited

U.S. PATENT DOCUMENTS

| | | | |
|---|---|---|---|
| 3,469,238 | 9/1969 | Partin | 250/578 |
| 3,792,268 | 2/1974 | Bjerke et al. | 250/216 |
| 3,902,049 | 8/1975 | Hanchett, Jr. | 235/462 |
| 4,358,794 | 11/1982 | Kurakami et al. | 250/578 |

Primary Examiner—David C. Nelms
Assistant Examiner—J. Brophy
Attorney, Agent, or Firm—Neal C. Johnson; Alan H. Haggard

[57] ABSTRACT

A multiple-head optical scanner includes a plurality of read heads for reading a column of video information at a scanning window. Each read head includes a photosensor array and a lens assembly. The lens assembly focuses the light flux reflected from a segment of the scanning window onto the photosensor array. The photosensor array converts the reflected light flux into electrical signals. The optical axes of adjacent read heads are aligned to intersect the document plane at the scanning window at different angles. In addition, the segment scanned by each read head overlaps a portion of the segment scanned by its adjacent read head.

12 Claims, 6 Drawing Figures

MULTIPLE HEAD OPTICAL SCANNER

BACKGROUND OF THE INVENTION

This invention relates to an optical scanner for character or bar code recognition systems and is directed more particularly to a multiple head optical scanner for reading a column of video information.

Many types of document handling apparatus require recognition systems for reading characters or bar codes on the documents. Some types of mail sorting equipment, for example, use optical character recognition (OCR) systems for sorting mail according to zip codes written on the envelopes. Other types of mail sorting equipment use bar code recognition (BCR) systems for sorting mail according to a bar code printed on the envelopes.

In optical character or bar code recognition systems, light reflected from a source document is processed so as to identify the characters or bar codes on that document. Such recognition systems usually comprise an optical scanner, signal processing circuitry, and recognition logic circuitry. The optical scanner or video lift is used to detect the magnitude of the light flux reflected from various points on the source document and to convert that information to electrical signals. The signal processing circuitry converts these electrical signals to digital signals representing the differences in contrast between the characters or bar codes on the source document and the background of the source document. These digital signals are processed by the recognition logic circuitry which identifies the characters or bar codes read from that document.

Currently, two types of video lifts are widely used in recognition systems for document handling apparatus. The first type of video lift is a flying spot scanner which uses a movable scanning beam to read a stationary source document. Many flying spot scanners use raster scan techniques and operate as a television camera tube to scan each row of a document in a point-by-point manner. The scanner produces an electrical signal for each point scanned. The series of electrical signals are processed and the video information from the document is identified. Other flying spot scanners use contour tracing techniques to follow the contour of each character. The horizontal and vertical deflections of the scanning beam are processed to identify each character scanned.

One problem with using conventional flying spot scanners in OCR or BCR systems for mail sorting equipment is that the source document remains stationary when that document is being read. Consequently, any document transport system must intermittently move a document to a read station before reading, stop the document during reading, and remove that document from that station after reading. This intermittent moving of a document not only increases the complexity of the transport system, but also limits the overall speed of the system. Although some document handling apparatus have been designed to use flying spot scanners to read moving documents, such apparatus have been overly complex or have required multiple read stations. See, for example, U.S. Pat. No. 3,846,753 by Arie A. Spanjersberg entitled "Automatic Address Detection System."

The second type of video lift used in document handling apparatus is a data lift which uses a stationary read head to scan a moving source document. Such read heads include a linear array of photosensitive cells aligned orthogonally to the motion of the document and a lens system for projecting the image at a scanning window onto the linear array. The cells of the array are scanned at a rate which is relatively high compared to the motion of the document through the read station. As a result, the array scans each character or bar code moving past the scanning window a multitude of times and generates a series of electrical signals. These signals may then be processed to identify the characters or bar codes on the source document.

One problem with data lifts having linear arrays is that current fabrication techniques limit the practical size of these linear arrays having acceptable resolution. Although some relatively large arrays having acceptable resolution have been fabricated, the cost of producing these arrays has been excessive. Consequently, the scanning height of data lifts using economical linear arrays is limited.

In many types of document handling apparatus, the location or position of the characters to be read cannot be accurately determined. Mail sorting machines, for example, read the zip code at the bottom of the mailing address. Due to varying sizes of envelopes, differing placements of the addresses, and other factors, the height of the area or window to be scanned by the data lift often exceeds the specifications of data lifts having linear arrays. As a result, data lifts using linear arrays have not been completely satisfactory for use on mail sorting machines.

In order to overcome the height restriction of data lifts, several attempts have been made to increase the scanning height of such data lifts. One such attempt is shown in the U.S. patent of R. J. Rabinow, et al, U.S. Pat. No. 3,538,499, entitled "Optical Reading Machine." This patent discloses an optical scanner comprising a linear array, several sets of light pipes, and several lens and shutter assemblies. The number of lens and shutter assemblies corresponds to the number of sets of light pipes and the number of light pipes in each set corresponds to the number of elements in the photosensitive array. The lens assemblies are positioned to successively read parallel lines of print from the document. Each lens assembly focuses the light reflected from one line of print onto one end of one of the sets of light pipes. The other end of each respective light pipe is aligned with a corresponding element of the photosensitive arrays. Shutters are provided so only one lens assembly and its corresponding set of light pipes is activating the photosensitive array at a time.

As a document moves through the read station of the above optical scanner, the first shutter operates allowing the first lens assembly to direct light reflected from one line of print onto the first set of light pipes and, therefore, to the photosensitive array. After that line of print has been read, the first shutter closes while the second shutter opens, thereby allowing the second lens assembly, second set of light pipes, and the photosensitive array to read the next line of print. Successive lines of print are read in a similar manner.

Although the scanner described in the Rabinow et al patent does permit multiple lines of print to be read by a single read head, that scanner still requires the lines of print to be located in relatively constant positions. Thus, the Rabinow et al patent does not describe an optical scanner suitable for use with mail having varying locations of the addresses on the envelopes.

Other attempts to increase the scanning area of a read head use beam splitters to direct light reflected from a document onto various arrays. One such arrangement is shown in the U.S. patent of William E. Althauser et al, U.S. Pat. No. 4,129,853, entitled "Method and Apparatus for Producing Compensated Signals for Individual Light Sensors Arranged in a Predetermined Pattern." Another arrangement is shown in the IBM Technical Disclosure Bulletin of D. L. Janeway, III and A. L. Mix, Jr., Vol. 20, No. 1, June 1977, entitled "Multiple Diode Array Optics." In these publications, the optical scanner includes a plurality of linear photodiode arrays, a beam splitter for dividing a light beam among the diode arrays, and a single lens for directing the light reflected from the source document towards the beam splitter and for focusing that light onto the linear arrays. This arrangement allows the plurality of photodiode arrays to operate as if the scanner comprised a single photodiode array having a single lens.

One problem with the above scanner is that the arrays must be in an exceptionally critical alignment with the beam splitter so the light beam may be split among the arrays. Another problem with that scanner is that the arrays and the lens must be precisely adjusted so the lens will accurately focus the light onto the photodiode arrays. As a result of these critical alignments and precise adjustments, these scanners are not completely satisfactory for use on equipment having significant vibration, such as high speed mail sorting equipment.

SUMMARY OF THE INVENTION

It is an object of the invention to provide an improved video lift for reading a column of video information at a scanning window.

Another object of the above invention is to provide a video lift having a relatively large scanning window.

Still another object of the invention is to provide a video lift comprising a plurality of photosensor arrays.

It is yet another object of the invention to provide a data lift including a plurality of read heads having optical axes which are aligned in at least two different planes.

A further object of the invention is to focus overlapping segments of the video information at the scanning window onto at least two photosensor arrays.

Generally, the invention comprises a multiple-head data lift for reading a column of video information at a relatively large scanning window. Each read head of the data lift has an optical axis and includes a photosensor array and a lens assembly. The photosensor array of each head converts light flux reflected from the source document into electrical signals. The lens assembly of each head focuses light flux reflected from a portion of the scanning window onto the photosensor array. The optical axes of adjacent read heads are aligned in different planes and the scanning area of each read head overlaps a portion of the scanning area of its adjacent read head.

DESCRIPTION OF THE INVENTION

Figure 1:
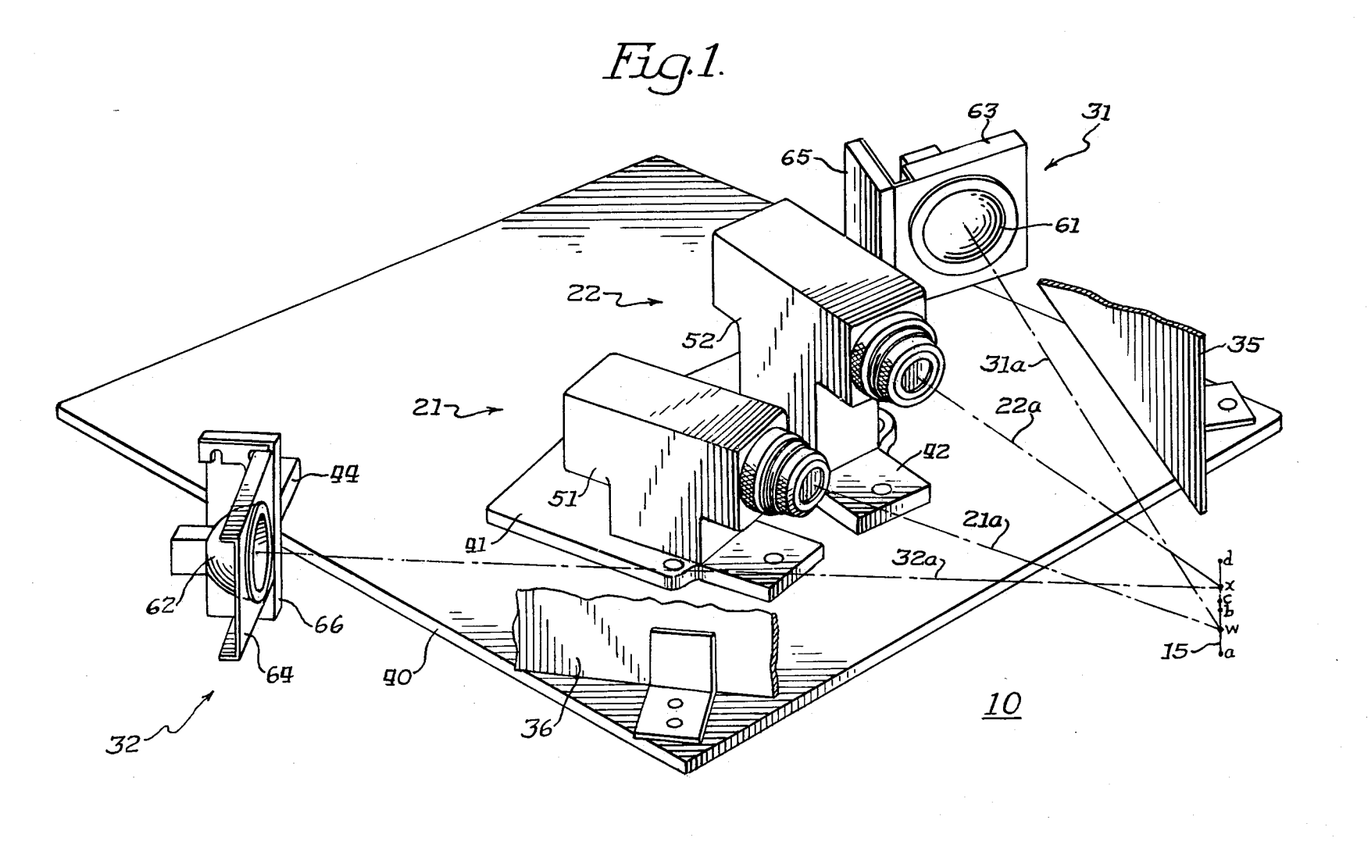
FIG. 1 is a perspective view of one embodiment of the invention.

Referring to FIG. 1, there is shown an optical scanner or video lift 10 for reading a column of video information at a scanning window 15. Scanning window 15 is shown in FIG. 1 as a vertical line and represents the narrow area scanned by the video lift. Optical scanner 10 is suitable for use as the data lift in a character or bar code recognition system in a mail sorting machine. Such a recognition system may be used to read the zip or bar code on an envelope as that envelope moves past the scanning window 15.

Figure 2:
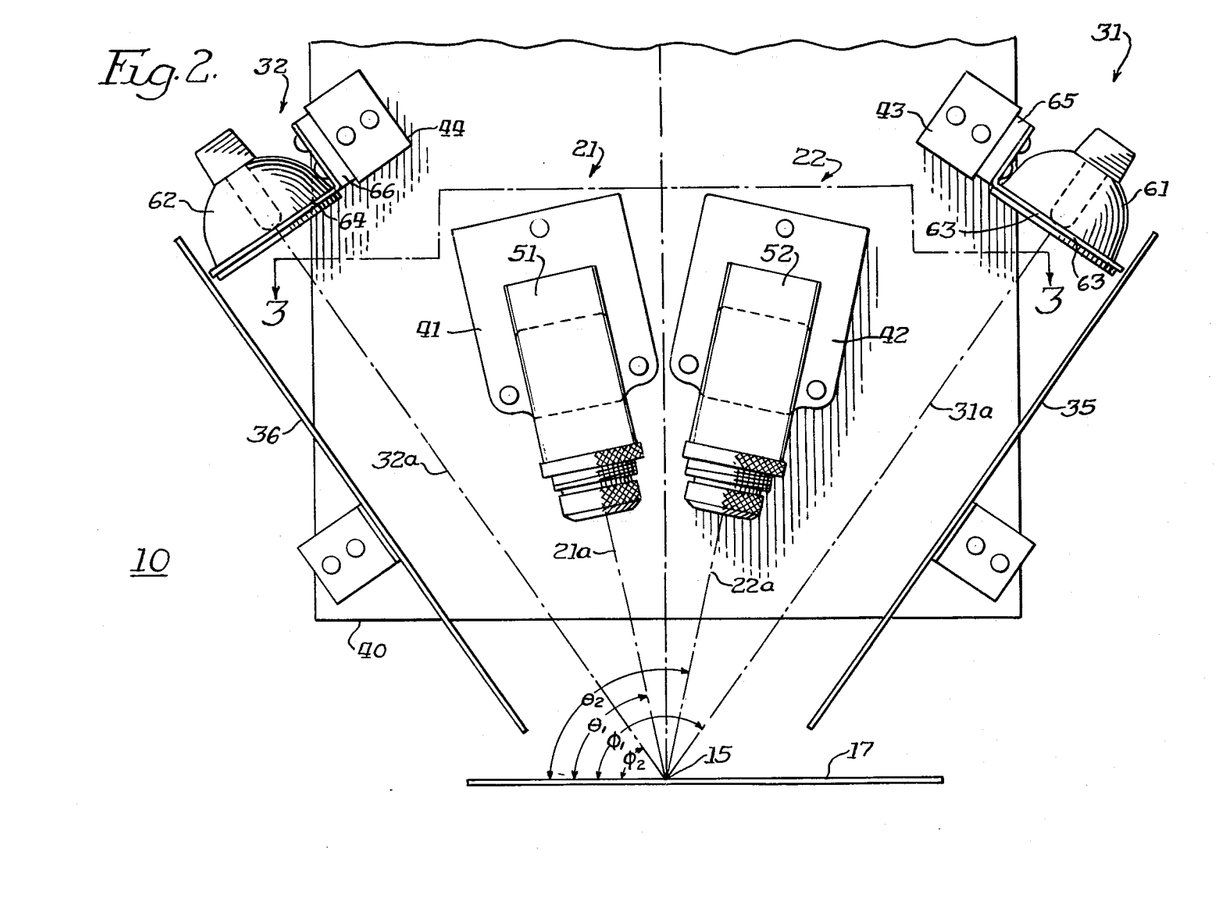
FIG. 2 is a top view of the invention shown in FIG. 1.

To the end that video lift 10 may read video information at window 15, there is provided, as shown in FIGS. 1 and 2, first reading means 21, second reading means 22, and illumination means comprising a first light source 31 and a second light source 32. First and second light sources 31 and 32 serve to illuminate the lower and upper portions, respectively, of a document, such as envelope 17 shown in FIG. 2, at scanning window 15. First reading means 21 reads the lower portion of the envelope at window 15 by converting the light flux reflected from the lower portion of the envelope into electrical signals. Similarly, second reading means 22 reads the upper portion of the envelope at window 15 by converting the light flux reflected from the upper portion of the envelope into electrical signals. Thus, reading means 21 and 22 and light sources 31 and 32 cooperate to read a column of video information from a document at scanning window 15.

As can be seen from FIGS. 1 and 2, light source 31 includes a lamp 61, a lamp holder 63, and a mounting upright 65 for supporting lamp holder 63. Lamp 61 comprises any suitable lamp for providing a relatively even illumination around an optical axis 31a. One type of lamp which has been found suitable for use in light source 31 is a prefocused microfilm projection lamp having an integral dichroic reflector. The dichroic reflector reflects the visible light provided by the lamp toward the scanning window while not reflecting the infrared portion of the light beam. As can be seen from the drawing, axis 31a is aimed at the lower portion of the scanning window. Thus, light source 31 provides a relatively even illumination of the lower portion of the scanning window.

Light source 32 includes a lamp 62, a lamp holder 64, and a mounting upright 65. Light source 32 functions similarly as light source 31 to provide a relatively even illumination around an optical axis 32a. As a result, light source 32 provides a relatively even illumination of the upper portion of the scanning window.

In view of the foregoing, it will be seen that first light source 31 and second light source 32 cooperate to provide a relatively even illumination of the lower and upper portions of the scanning window. It will be understood that an additional light source may be used if additional illumination of the scanning window is required.

Figure 4:
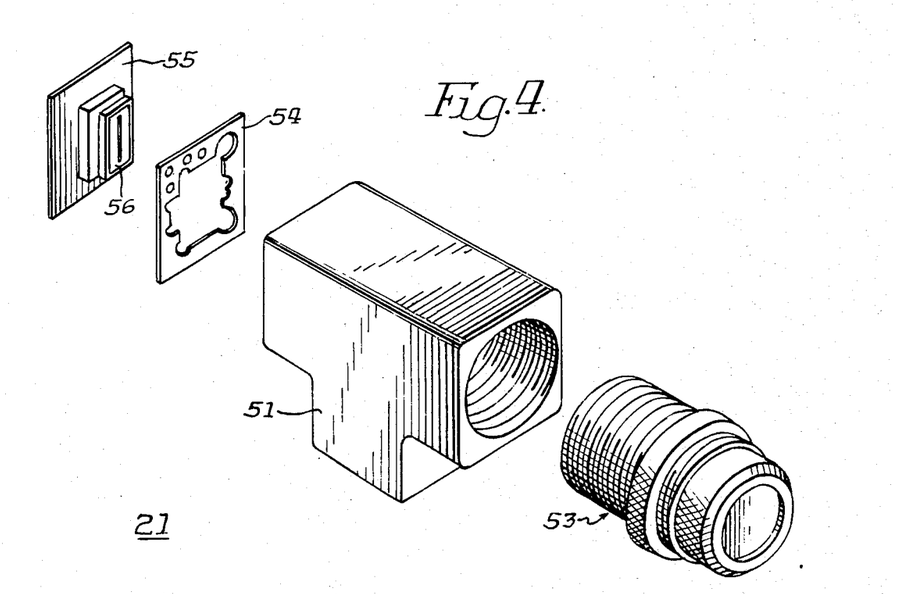
FIG. 4 is an exploded view of one of the read heads shown in FIG. 1.

To the end that first reading means 21 may convert light flux to elelctrical signals, reading means 21 comprises, as shown in FIG. 4, a read head including a lens assembly 53, an insulating spacer 54, and an electrical circuit board 55 housed in a first mounting block 51. Spacer 54 provides circuit board 55 with the necessary mechanical connection and electrical insulation from the read mounting block 51. The lens assembly 53 is threaded into the front of mounting block 51 and may be turned to provide the necessary focus adjustments.

Mounted on circuit board 55 is a linear photodiode array 56 for converting light flux to electrical signals. As can be seen from FIG. 4, the linear array is aligned so the photosensitive elements form a vertical line, i.e., a line parallel to the vertical scanning line shown in FIG. 1 as window 15. Array 56 may comprise, for example, a serial output, self-scanning linear array having 256 photosensitive elements. Such arrays are well known to those skilled in the art and need not be further described.

Lens assembly 53 is the video input of reading means 21 and focuses light onto the photodiode array. One lens found suitable for use in assembly 53 is a Hastings triplet lens, sometimes referred to as a triple aplanat cemented achromat lens. The lens is selected to provide a suitable focal length and depth of field for documents of varying thicknesses. This lens may be mounted in a standard lens barrel.

The optical axis of lens assembly 53 is aligned with the optical axis, i.e., the midpoint, of array 56 to form the optical axis of the first read head. This optical axis, shown herein as axis 21a, is aimed at the lower portion of the scanning window. Thus, lens assembly 53 focuses light flux reflected from the lower portion of scanning window 15 onto the photodiode array 56.

In light of the above, it will be seen that lens assembly 53 and photodiode array 56 of the first read head cooperate to convert the light flux reflected from the lower portion of scanning window to elelctrical signals. It will also be seen that the optical axis of the first read head is aimed at the lower portion of the scanning window.

Second reading means 22 is similar to first reading means 21 and operates in a similar manner under similar conditions. Reading means 22 comprises a second read head housed in a second mounting block 52. This second read head has an optical axis 22a aimed at the upper portion of scanning window 15. As a result, reading means 22 serves to convert the light flux reflected from the upper portion of scanning window 15 to electrical signals.

In view of the foregoing it will be seen that reading means 21 serves to convert the light flux reflected from the lower portion of a document at scanning window 15 to electrical signals. It will also be seen that reading means 22 serves to convert the light flux reflected from the upper portion of a document at scanning window 15 to electrical signals.

As shown in FIGS. 1 and 2, first and second reading means 21 and 22 and first and second light sources 31 and 32 are all mounted on a base plate 40. More particularly, mounting block 51 of the first reading means is connected to base plate 40 through a first mounting plate 41. Similarly, mounting block 52 of the second reading means is connected to base plate 40 through a second mounting plate 42. Also, first and second light sources 31 and 32 are connected to plate 40 through third and fourth mounting plates 43 and 44, respectively. The mounting plates and base plate serve as means for aligning and aiming the optical axis of the reading means and light sources accurately at window 15.

Also shown in FIGS. 1 and 2 are first and second light shields 35 and 36. The light shields prevent stray light from the light sources from illuminating other photosensitive areas of the mail handling apparatus.

In accordance with one aspect of the present invention, the first and second read heads are positioned so their optical axes intersect the document plane at the scanning window at different angles. Referring primarily to FIG. 2, it will be seen that the optical axis 21a of the first read head intersects the scanning window at an angle $\theta_1$, when referenced from the left side of envelope 17. Similarly, optical axis 22a of the second read head intersects the scanning window at an angle $\theta_2$. Angles $\theta_1$ and $\theta_2$ are chosen to provide the required clearance for the read heads. It has been found that particularly suitable angles for $\theta_1$ range from 60° to 85° and for $\theta_2$ range from 95° to 120°.

One particularly advantageous feature of the invention is that the read heads need not be at right angles to the document plane. Since the photosensitive arrays are linear instead of area arrays, the read heads detect light reflected from a relatively narrow line on the document. This narrow line may be detected by the linear arrays at angles which are relatively small acute angles.

As stated above, the optical axes of the read heads intersect the scanning window at different points. In mathematics, when two straight lines intersect a third line at different points and at different angles, the first two lines are aligned in two different planes. As can be seen from FIG. 1, the optical axes of the read heads intersect the scanning window at different points. Consequently, the optical axes of the read heads are aligned in different planes.

In accordance with another aspect of the invention, light sources 31 and 32 are also positioned so their optical axes intersect the document plane at the scanning window at different angles. Again referring to FIG. 2, axes 31a and 32a of the first and second light sources intersect the scanning window at angles $\phi_1$ and $\phi_2$, respectively. Particularly suitable angles for $\phi_1$ range from 110° to 140° and for $\phi_2$ range from 40° to 70°.

From the foregoing, it will be seen that the first light source illuminates the lower portion of the scanning window and that the optical axis of that source intersects the document plane at the window at an angle $\phi_1$. The first reading means detects the light flux reflected from the lower portion of the scanning window and has an optical axis that intersects the document plane at the window at an angle $\theta_1$. It will also be seen that the second light source illuminates the upper portion of the scanning window and that the optical axis of that source intersects the document plane at the window at an angle $\phi_2$. The second reading means detects the light flux reflected from the lower portion of the scanning window and has an optical axis which intersects the document plane at the window at an angle $\theta_2$. Thus, video lift 10 comprises a pair of data lifts having their optical axes intersect the scanning window at different angles, i.e., having their optical axes aligned in differing planes. Lift 10 also comprises a pair of light sources having their optical axes intersect the scanning window at different angles.

Figure 3:
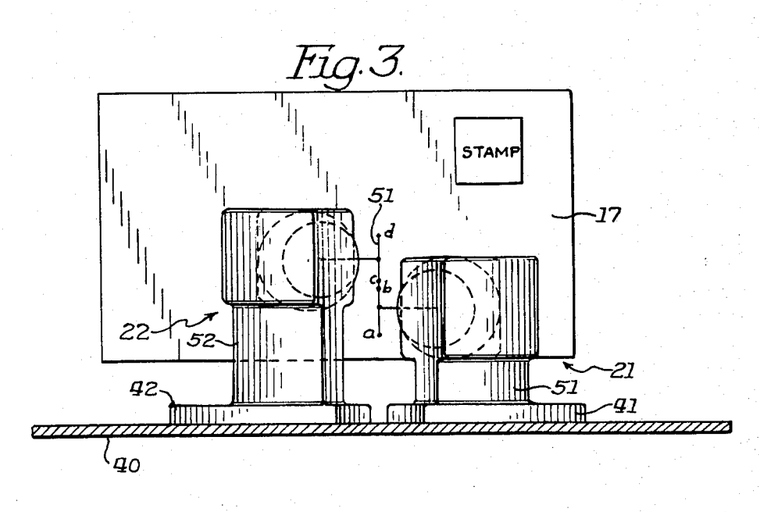
FIG. 3 is a rear view of that part of the invention shown in FIG. 1 taken along sectional line 3—3.

Pursuant to another feature of the invention, the linear segment scanned by the first reading means overlaps a portion of the linear segment scanned by the second reading means. Referring to FIGS. 1 and 3, it will be seen that optical axis 21a of the first reading means is aimed at point W of the scanning window. Since the area scanned by reading means 21 is symmetrical about the axis, that reading means scans that portion of the scanning window from point A to point C. Similarly, optical axis 22a of the second reading means is aimed at point X and scans that portion of the scanning window from point B to point D. As can be appreciated from the drawings, that portion of the scanning window from point B to point C is read by both reading means 21 and reading means 22.

This scanning overlap detected by both reading means allows the optical axes of the reading means to be aimed at the scanning window without the need for critical horizontal adjustment. Moreover, as will be described in greater detail below, the scanning overlap may be made greater than the height of the characters to be read in order to assure that a line of print may be fully read by one of the reading means.

In a mail sorting machine, the data lift of an OCR is used to read the zip code in the bottom line of the mailing address. Since that zip code is in the last line of the address, the data lift need only read the bottom line of the mailing address.

Referring to FIG. 3, there is shown reading means 21 and 22 aimed at an envelope 17. When viewed from the front of the document, the optical axes of reading means 21 and 22 are nearly perpendicular to the line represented by points A to D even though those axes intersect the document plane at different angles. Envelope 17 is moved from left to right past the scanning window by a document transport system, not shown herein. As the document moves past the scanning window, both of the reading means are sampled at a relatively high rate so as to provide a corresponding high number of sets of electrical signals.

Due to varying sizes of envelopes, differing placements of the address, and other factors, the bottom line of the mailing address may appear at the scanning window anywhere from point A to point D. Reading means 21 scans the lower portion of the window 15 and reads any portion of the address appearing between points A and C. Reading means 22 scans the upper portion of window 15 and reads any portion of the address appearing between points B and D.

In this embodiment, the distance between points B and C is chosen to be greater than the character height of the numbers in the zip code. Consequently, as long as the entire bottom line of the address appears below point C, reading means 21 will read that line of print. If, however, any significant portion of the bottom line of print appears above point C, reading means 21 will be unable to read that line of print. Since, however, the scanning overlap between points B and C is greater than the character height of the numbers of the zip code, reading means 22 will now be able to read the entire bottom line of print. Thus, one of the reading means will be able to read the zip code appearing at the scanning window between points A and D.

It will be understood that the scanning overlap need not exceed the height of the characters on the source document. Moreover, the recognition system may electronically delete the duplicate information supplied by one of the reading means in order to electronically simulate a single read head which scans window 15 from point A to point D.

Figure 5:
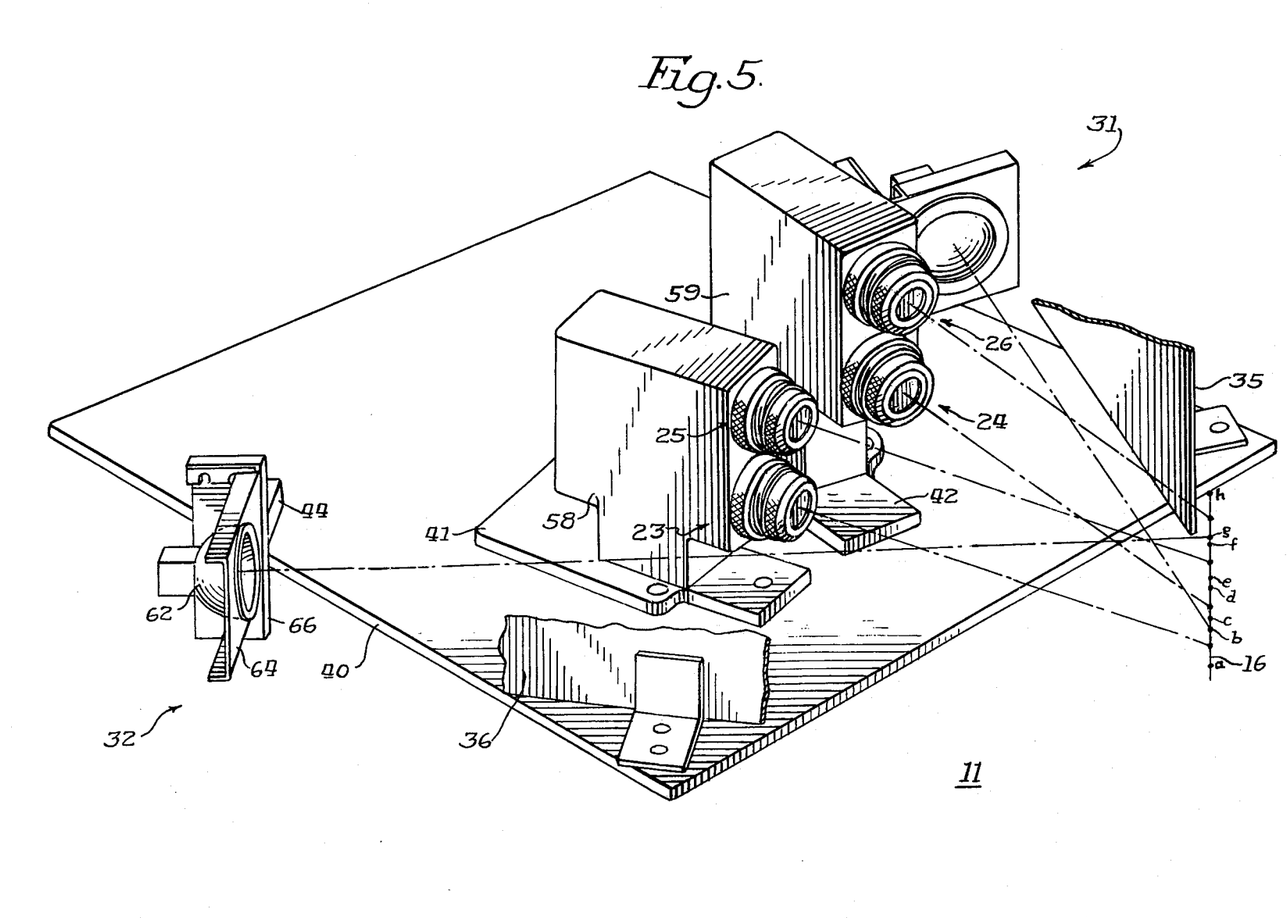
FIG. 5 is a perspective view of another embodiment of the invention.
Figure 6:
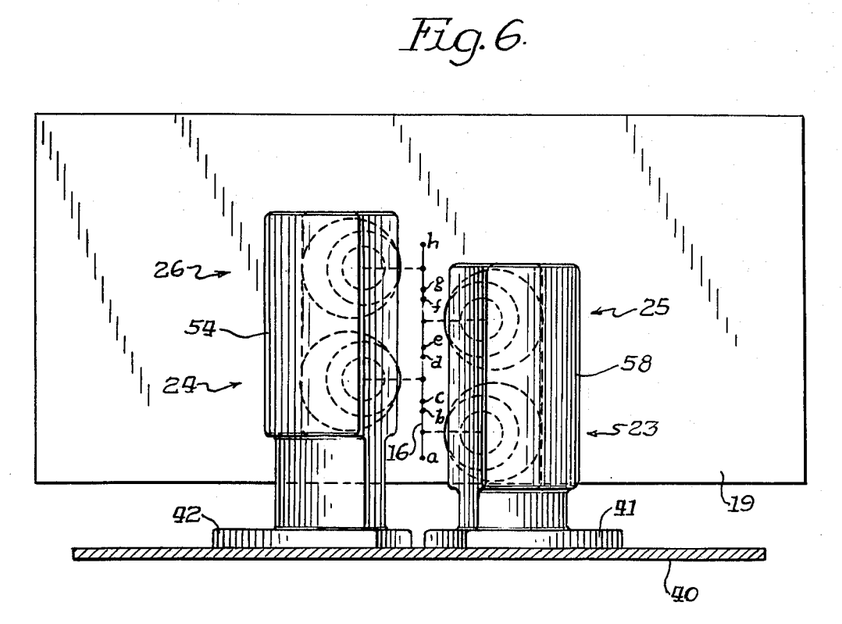
FIG. 6 is a rear view of that part of the invention shown in FIG. 5 taken along sectional line 5—5.

Referring now to FIGS. 5 and 6, there is shown another embodiment of the invention comprising a video lift 11 for reading a column of video information from an envelope 19 at a scanning window 16. Video lift 11 is similar to video lift 10 and like parts are similarly numbered. Only the differences will be described herein.

Video lift 11 includes a first reading means 23, a second reading means 24, a third reading means 25, and a fourth reading means 26. Also included are first mounting block 58 for housing reading means 23 and 25 and a second mounting block 59 for housing reading means 24 and 26. Each of the reading means shown in FIG. 5 is similar to the reading means 21 shown in FIGS. 1 and 4 and will not be further described.

As can be seen from FIG. 6, the addition of two read heads greatly increases the height of scanning window 16 over window 15 and may be used to read the entire mailing address appearing on envelope 19. Reading means 23, 24, 25, and 26 read that portion of the scanning line from points A to C, B to E, D to G, and F to H, respectively.

Due to the increased number of read heads, there are now three areas which are read by two read heads. More particularly, read heads 23 and 24 both read between points B and C, read heads 24 and 25 both read between points D and E, and read heads 25 and 26 both read between points F and G. In other words, adjacent read heads read overlapping segments of the video information at window 16. Thus, each line of the mailing address will be fully read by at least one of the read heads.

It will also be seen that the optical axes of reading means 23 and 25 are aligned in one plane and that the optical axes of reading means 24 and 26 are aligned in a different plane. In summary, video lift 11 comprises an optical scanner having a first pair of read heads with their optical axes aligned in a first plane and a second pair of read heads with their optical axes aligned in a second plane.

It will be understood that the embodiments shown herein are for illustrative purposes only and may be changed or modified without departing from the spirit and scope of the present invention as set forth in the appended claims.

What is claimed is:

1. A video input device for converting a column of video information on a document which moves relative to a scanning line at a scanning window which is in the plane of the document to a plurality of electrical signals, comprising:

lighting means for providing light flux at the scanning window;

a plurality of reading means, each reading means including a lenticular video input having an optical axis and an electrical output and serving as means for converting light flux at its video input to an electrical signal at its output;

first means for aligning the optical axis of at least one of the video inputs to be substantially perpendicular to the scanning line and to intersect the document plane at the scanning window at a first angle and for aiming the video input of at least one of the reading means aligned at the first angle to read a first segment of the column of video information at the scanning window; and second means for aligning the optical axis of at least one of the other video inputs to be substantially perpendicular to the scanning line and to intersect the document plane at the scanning window at a second angle which is different from the first angle and for aiming the video input of at least one of the reading means aligned at the second angle to read a second segment of the column of video information at the scanning window.

2. A device as set forth in claim 1 wherein the lighting means includes:
   a first and a second light source for providing light flux; and
   means for aligning the optical axes of the light sources in different planes such that the planes intersect at the scanning line.

3. A device as set forth in claim 2 wherein each reading means further includes a photosensor array for converting light flux to an electrical signal and wherein the lenticular video input of each reading means serves as means for focusing light flux reflected from the scanning window onto the photosensor array.

4. A device as set forth in claim 3 wherein each photosensor array comprises a linear array.

5. A device as set forth in claim 1 wherein the first segment of the column of video information at the scanning window overlaps a portion of the second segment of the column of video information at the scanning window.

6. A video input device as set forth in claim 5 wherein the video information comprises lines of characters and wherein the overlapping portion of the scanning window is greater than the height of one line of characters.

7. A video lift for converting a column of video information at a scanning window to a plurality of electrical signals, comprising:
   lighting means for providing light flux at the scanning window;
   first and second reading means, each reading means including a photosensor array for converting light flux to an electrical signal and a lens assembly for focusing light flux onto the photosensor array, each lens assembly having an optical aixs; and
   mounting means for aligning the optical axis of the lens assemblies of the first and second reading means in different planes which are perpendicular to the scanning window and which intersect the scanning window at different angles and for aiming the first and second reading means to read overlapping segments of information at the scanning window.

8. A video lift as set forth in claim 7 wherein the lighting means includes:
   a plurality of light sources for providing light flux;
   first aligning means for aligning the optical axis of at least one of the light sources in a first plane which intersects the scanning window at a first angle; and
   second aligning means for aligning the optical axis of at least one of the light sources in a second plane which intersects the scanning window at a second angle.

9. A device as set forth in claim 7 wherein each photosensor array comprises a linear array.

10. A video lift as set forth in claim 7 wherein the video information comprises lines of characters and wherein the overlapping segments of information are greater than the height of the characters to be read.

11. A data lift for reading a column of video information at a scanning window, comprising:
   a light source for providing light flux to the scanning window;
   a first photosensor array for converting light flux to electrical signals;
   a first lens assembly for focusing light flux reflected from a portion of the scanning window onto the first photosensor array;
   a second photosensor array for converting light flux to electrical signals;
   a second lens assembly for focusing light flux reflected from a portion of the scanning window onto the second photosensor array; and
   mounting means for aligning the optical axes of the lens assemblies in different planes which are perpendicular to the scanning window and which intersect the scanning window at different angles.

12. A data lift for reading a column of video information on a document which moves relative to a scanning line at a scanning window, comprising:
   a light source provided at the scanning window;
   a first photosensor array having its photosensitive elements aligned parallel to the scanning line;
   a second photosensor array having its photosensitive elements aligned parallel to the scanning line;
   a first lens assembly located between the first photosensor array and the scanning window;
   a second lens assembly located between the second photosensor array and the scanning window;
   a first mounting assembly for mounting the first photosensor array and the first lens assembly such that the optical axis of the first photosensor array and first lens assembly is substantially perpendicular to the scanning line and intersects a document at the scanning window at a first angle; and
   a second mounting assembly for mounting the second photosensor array and the second lens assembly such that the optical axis of the second photosensor array and second lens assembly is substantially perpendicular to the scanning line and intersects a document at the scanning window at a second angle which is different than the first angle.

* * * * *